(12) United States Patent
Xu et al.

(10) Patent No.: US 11,641,170 B2
(45) Date of Patent: May 2, 2023

(54) POWER TOOL AND CONTROL METHOD THEREOF

(71) Applicant: Nanjing Chervon Industry Co., Ltd., Nanjing (CN)

(72) Inventors: Tianxiao Xu, Nanjing (CN); Qi Du, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 2 days.

(21) Appl. No.: 17/474,432

(22) Filed: Sep. 14, 2021

(65) Prior Publication Data

US 2022/0094287 A1    Mar. 24, 2022

(30) Foreign Application Priority Data

Sep. 21, 2020 (CN) .......................... 202010997847.7

(51) Int. Cl.
| | |
|---|---|
| *H02P 1/04* | (2006.01) |
| *H02P 6/24* | (2006.01) |
| *H02K 11/33* | (2016.01) |
| *H02P 29/40* | (2016.01) |
| *B25F 5/02* | (2006.01) |
| *B24B 23/02* | (2006.01) |

(52) U.S. Cl.
CPC ................. *H02P 6/24* (2013.01); *B25F 5/02* (2013.01); *H02K 11/33* (2016.01); *H02P 29/40* (2016.02); *B24B 23/02* (2013.01)

(58) Field of Classification Search
CPC . H02P 6/24; H02P 29/40; B24B 23/02; B25F 5/02
See application file for complete search history.

(56) References Cited

U.S. PATENT DOCUMENTS

| | | | |
|---|---|---|---|
| 2018/0367070 A1* | 12/2018 | Ichikawa | .................. H02P 3/12 |
| 2019/0229599 A1 | 7/2019 | Xu et al. | |
| 2020/0067435 A1 | 2/2020 | Nishimiya et al. | |
| 2021/0362313 A1 | 11/2021 | Wang et al. | |
| 2022/0242339 A1* | 8/2022 | Leon | ...................... B60R 16/03 |

FOREIGN PATENT DOCUMENTS

CN            209964341 U        1/2020

* cited by examiner

Primary Examiner — Karen Masih
(74) Attorney, Agent, or Firm — Greenberg Traurig, LLP (57) ABSTRACT

A power tool includes a motor, a signal switch, a signal detection circuit, a power-on control switch, a first controller, and a second controller. The signal switch is used to switch a power on/off state of the power tool. The signal detection circuit is configured to output a detection signal according to a connection state of the signal switch. The power-on control switch is connected to the second controller. The first controller is configured to control an on/off state of the power-on control switch. When the signal detection circuit outputs a power-off signal, the first controller controls the power-on control switch to be turned off so that the second controller is de-energized and the motor stops rotating. When the power-on control switch still remains on, the second controller controls the switch elements in the driver circuit to be turned off so that the motor stops rotating.

13 Claims, 10 Drawing Sheets

POWER TOOL AND CONTROL METHOD THEREOF

RELATED APPLICATION INFORMATION

This application claims the benefit under 35 U.S.C. § 119(a) of Chinese Patent Application No. CN 202010997847.7, filed on Sep. 21, 2020, which is incorporated by reference in its entirety herein.

BACKGROUND

During the production of a power tool, safety is the most basic and most important performance index for testing whether the power tool can be launched on the market normally. In the safety specifications of the power tool, various safety requirements, for example, safety requirements of a switch control circuit, are involved.

To design a control switch that satisfies the safety specifications, a high-current switch is generally used for controlling the power tool to be powered on or off. For the power tool using the high-current switch, even if a single-chip microcomputer in a control circuit of the power tool fails, the high-current switch can directly cut off a power supply connected to a motor to achieve power-off control and avoid safety accidents. However, the high-current switch is generally a large-volume mechanical switch that requires a lot of efforts to operate and has relatively poor user experience. In addition, a large current flowing through the high-current switch for a long time will damage contacts of the high-current switch, thereby reducing control safety.

Therefore, how to provide a power tool with higher safety on the basis of high operability of power on-off control is a technical problem to be solved in the art.

SUMMARY

A power tool includes a motor; a power supply interface configured to be connected to a power supply; a controller configured to control the operation of the motor, wherein the controller includes a first controller and a second controller; an auxiliary power supply circuit configured to power on the controller; a signal switch triggerable by a user to switch a power on/off state of the power tool; a signal detection circuit connected between the signal switch and the controller and configured to output a corresponding detection signal according to a connection state of the signal switch, wherein the detection signal includes a power-on signal and a power-off signal; a power-on control switch connected between the auxiliary power supply circuit and the second controller and configured to control a power-on state of the second controller; and a driver circuit connected between the second controller and the motor, including several semiconductor switch elements, and configured to switch an energized state of the motor; wherein the first controller electrically connected to at least the power-on control switch and configured to control an on/off state of the power-on control switch, the second controller connected to at least the signal detection circuit, the power-on control switch, and the driver circuit and configured to control on/off states of the switch elements in the driver circuit; wherein in a case where the signal detection circuit outputs the power-off signal, the first controller controls the power-on control switch to be turned off so that the second controller is de-energized and the motor stops rotating; and in a case where the signal detection circuit outputs the power-off signal and the power-on control switch still remains on, the second controller controls the switch elements in the driver circuit to be turned off so that the motor stops rotating.

In one example, the power-on signal includes that an output voltage of the signal detection circuit jumps from a high voltage to a low voltage, and the power-off signal includes that the output voltage of the signal detection circuit jumps from the high voltage to the low voltage in a case where the motor is on.

In one example, the first controller controls the power-on control switch to be turned on in a case where the power supply interface is connected to the power supply, the second controller is powered on in a case where the power-on control switch is on, and the second controller controls the motor to rotate in a case where the signal detection circuit outputs the power-on signal.

In one example, the first controller controls the power-on control switch to be turned on in a case where the signal detection circuit outputs the power-on signal, the second controller is powered on in a case where the power-on control switch is on, and the second controller controls the motor to rotate in the case where the signal detection circuit outputs the power-on signal.

In one example, in a case where the motor is on and the signal detection circuit outputs the power-off signal, the first controller controls the power-on control switch to be turned off after a preset time period so that the second controller is de-energized and the motor stops rotating.

A control circuit includes a motor; a controller, wherein the controller includes a first controller and a second controller; a power supply interface configured to be connected to a power supply; an auxiliary power supply circuit configured to power on the controller; a signal switch triggerable by a user to switch a power on/off state of a power tool; a signal detection circuit connected between the signal switch and the controller and configured to output a corresponding detection signal according to a connection state of the signal switch, wherein the detection signal includes a power-on signal and a power-off signal; a power-on control switch connected between the auxiliary power supply circuit and the second controller and configured to control a power-on state of the second controller; and a driver circuit connected between the second controller and the motor, including several semiconductor switch elements, and configured to switch an energized state of the motor; wherein the first controller electrically connected to at least the power-on control switch and configured to control an on/off state of the power-on control switch, the second controller connected to at least the signal detection circuit, the power-on control switch, and the driver circuit and configured to control on/off states of the switch elements in the driver circuit; wherein in a case where the signal detection circuit outputs the power-off signal, the first controller controls the power-on control switch to be turned off so that the second controller is de-energized and the motor stops rotating; and in a case where the signal detection circuit outputs the power-off signal and the power-on control switch still remains on, the second controller controls the switch elements in the driver circuit to be turned off so that the motor stops rotating.

In one example, the power-on signal includes that an output voltage of the signal detection circuit jumps from a high voltage to a low voltage, and the power-off signal includes that the output voltage of the signal detection circuit jumps from the high voltage to the low voltage in a case where the motor is on.

In one example, the first controller controls the power-on control switch to be turned on in a case where the power supply interface is connected to the power supply, the second controller is powered on in a case where the power-on control switch is on, and the second controller controls the motor to rotate in a case where the signal detection circuit outputs the power-on signal.

In one example, the first controller controls the power-on control switch to be turned on in a case where the signal detection circuit outputs the power-on signal, the second controller is powered on in a case where the power-on control switch is on, and the second controller controls the motor to rotate in the case where the signal detection circuit outputs the power-on signal.

In one example, in a case where the motor is on and the signal detection circuit outputs the power-off signal, the first controller controls the power-on control switch to be turned off after a preset time period so that the second controller is de-energized and the motor stops rotating.

A control method of a power tool, wherein the control method is used for controlling the power tool, the power tool includes a power supply interface connected to a power supply; a controller; an auxiliary power supply circuit configured to power on the controller, wherein the controller includes a first controller and a second controller; a motor configured to supply impetus to the power tool; a signal switch triggerable by a user to switch a power on/off state of the power tool; a power-on control switch connected between the auxiliary power supply circuit and the second controller and configured to control a power-on state of the second controller; and a driver circuit connected between the second controller and the motor to switch an energized state of the motor and including several semiconductor switch elements, the first controller electrically connected to at least the power-on control switch and configured to control an on/off state of the power-on control switch, and the second controller connected to at least a signal detection circuit, the power-on control switch, and the driver circuit and configured to control on/off states of the switch elements in the driver circuit; and wherein the control method includes: in a case where the signal detection circuit outputs a power-off signal, controlling, by the first controller, the power-on control switch to be turned off so that the second controller is de-energized and the motor stops rotating; and in a case where the signal detection circuit outputs a power-off signal and the power-on control switch still remains on, controlling, by the second controller, the switch elements in the driver circuit to be turned off so that the motor stops rotating.

In one example, a power-on signal includes that an output voltage of the signal detection circuit jumps from a high voltage to a low voltage, and the power-off signal includes that the output voltage of the signal detection circuit jumps from the high voltage to the low voltage in a case where the motor is on.

In one example, the first controller controls the power-on control switch to be turned on in a case where the power supply interface is connected to the power supply, the second controller is powered on in a case where the power-on control switch is on, and the second controller controls the motor to rotate in a case where the signal detection circuit outputs the power-on signal.

The beneficial effect of the present disclosure is that the power tool is provided which has relatively high control safety and satisfies high operability of power on-off control of the tool.

DETAILED DESCRIPTION

The present disclosure is described below in detail in conjunction with drawings and examples. It is to be understood that the examples described herein are intended to explain the present disclosure and not to limit the present disclosure. Additionally, it is to be noted that for ease of description, merely part, not all, of the structures related to the present disclosure are illustrated in the drawings.

Power tools to which the technical solutions of the present disclosure are applicable include, but are not limited to, an electric drill, an electric circular saw, a reciprocating saw, a sander, a snow blower, a hair dryer, and other high-pressure brushless tools. Other types of power tools that can use the essential content of the technical solutions described below fall within the scope of the present disclosure. In the present application, a high-pressure brushless sanding product is used as an example.

Figure 1:
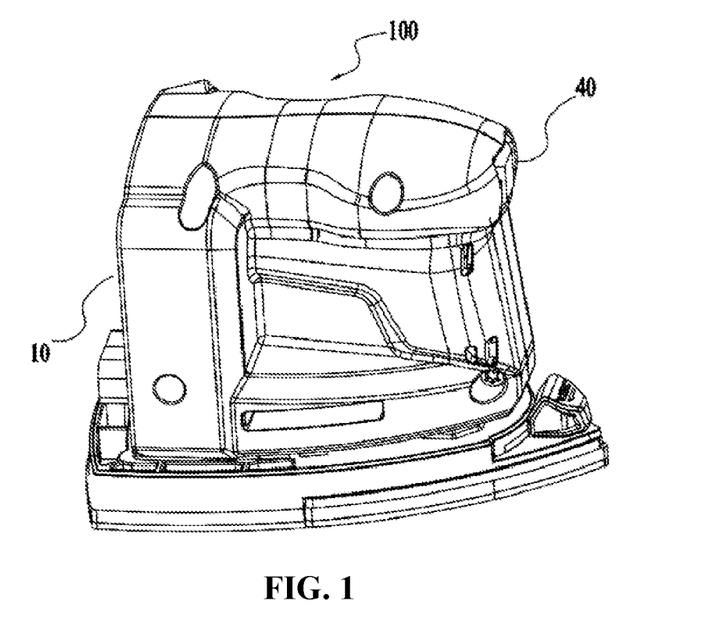
FIG. 1 is a structure view of a power tool according to an example.
Figure 2:
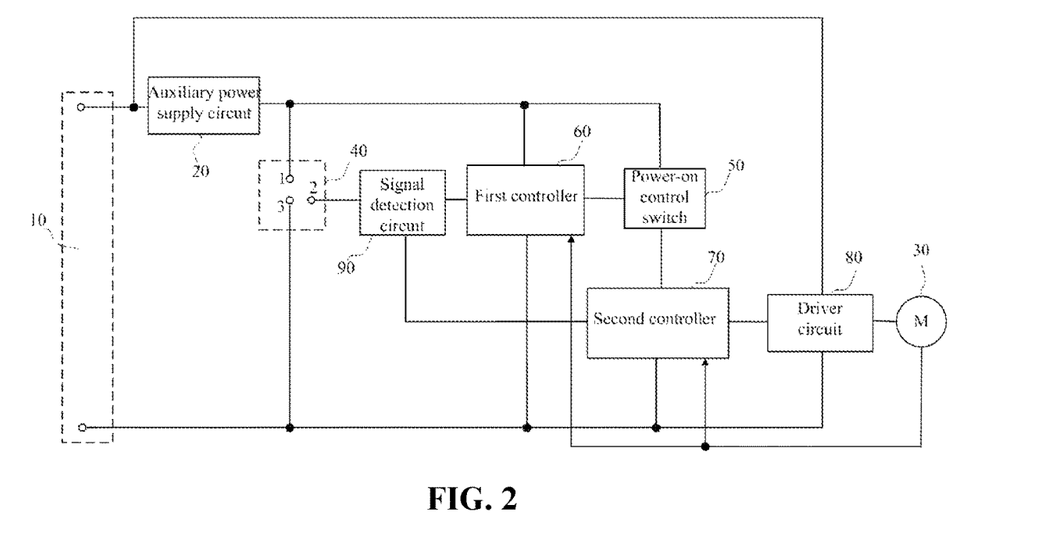
FIG. 2 is a circuit block diagram of a power tool according to an example.

Referring to a power tool 100 shown in FIGS. 1 and 2, the power tool 100 includes at least a power supply interface 10, an auxiliary power supply circuit 20, a motor 30, a signal switch 40, a power-on control switch 50, a first controller 60, a second controller 70, a driver circuit 80, and a signal detection circuit 90.

The power supply interface 10 is configured to be connected to a power supply. In an example, the power supply connected to the power supply interface 10 may be alternating-current (AC) mains. In an example, the power supply connected to the power supply interface 10 may be a battery pack, and the battery pack may be composed of a set of cells. For example, cells may be connected in series to form a single power supply branch to form a 1P battery pack. After being converted by the auxiliary power supply circuit 20, a power voltage accessed through the power supply interface 10 can power on the first controller 60 and the second controller 70.

The signal switch 40 is connected between the auxiliary power supply circuit 20 and the first controller 60. The signal switch 40 is connected between the auxiliary power supply circuit 20 and the second controller 70. In an example, as shown in FIG. 2, the signal switch 40 is a point-contact switch with connecting contacts 1, 2, and 3, where the contact 1 is always in a suspended state and not in contact with other contacts, and a connection is established between the contacts 2 and 3 when the signal switch 40 performs a power on/off operation. In an example, a user may perform a pressing operation or other control operations on the signal switch 40 so that the signal switch 40 controls the power tool 100 to be powered on or off when being pressed. Specifically, in the case where the signal switch 40 is in a pressed state, the contacts 2 and 3 are connected, the signal switch 40 is grounded, and an output voltage of the signal detection circuit 90 connected to the contact 2 of the signal switch 40 jumps from a high voltage to a low voltage, that is, the signal detection circuit 90 outputs a power-on signal when the switch 40 is pressed; in the case where the signal switch 40 is in a non-pressed state, the contacts 2 and 3 are not in contact with each other, and the output voltage of the signal detection circuit 90 remains a high-voltage state.

Figure 3:
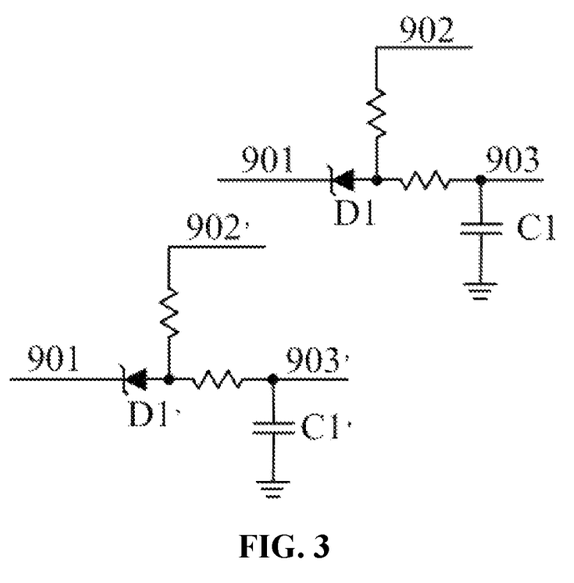
FIG. 3 is a circuit diagram of a signal detection circuit according to an example.

It can be seen from the above that the signal detection circuit 90 connected between the signal switch 40 and the first controller 60 outputs a signal indicating that the power tool 100 is powered on or off by detecting a connection state of the contacts in the signal switch 40. In an example, the power-on signal is that the output voltage of the signal detection circuit 90 jumps from a high voltage to a low voltage; and a power-off signal is that the output voltage of the signal detection circuit 90 jumps from a high voltage to a low voltage in the case where the motor 30 is on, that is, when the power tool 100 is operating normally. In an example, the signal switch 40 may remain pressed for a time period. During this time period, the voltage outputted by the signal detection circuit 90 is the low voltage, during which a low-voltage signal outputted by the signal detection circuit 90 is also a power on/off signal. In an example, as shown in FIG. 3, the signal detection circuit 90 includes at least an input interface 901, power supply interfaces 902 and 902', output interfaces 903 and 903', diodes D1 and D1', and capacitors C1 and C1'.

In an example, interfaces 901, 902, and 903, a diode D1, and a capacitor C1 form a first detection circuit to transmit the power on/off signal to the first controller 60; and interfaces 901, 902', and 903', a diode D1', and a capacitor C1' form a second detection circuit to transmit the power on/off signal to the second controller 70. In a specific implementation, the interface 901 is connected to the contact 2 of the signal switch 40; the interface 902 is connected to the first controller 60 or the auxiliary power supply circuit 20 so that a single-chip microcomputer voltage or an auxiliary voltage is acquired as a reference voltage; the interface 902' is connected to the second controller 70 or the auxiliary power supply circuit 20 so that the single-chip microcomputer voltage or the auxiliary voltage is acquired as the reference voltage; the interface 903 is connected to the first controller 60 so that the power on/off signal is outputted to the first controller 60; and the interface 903' is connected to the second controller 70 so that the power on/off signal is outputted to the second controller 70.

In a specific implementation, the first detection circuit is used as an example. In the case where the signal switch 40 is not pressed, the contact 2 of the signal switch 40 is suspended, the diode D1 is off, and the signal detection circuit 90 outputs a high-voltage signal through the interface 903; in the case where the signal switch 40 is pressed, the contacts 2 and 3 are connected, the signal switch 40 is grounded, the diode D1 is turned on, a current flowing in from the interface 902 enters the ground through the diode D1, and the signal detection circuit 90 outputs the low-voltage signal through the interface 903. It is to be understood that in the case where the signal switch 40 is pressed, the output voltage of the signal detection circuit 90 jumps from the high voltage to the low voltage, which can be understood as the signal detection circuit 90 outputting the power-on signal. Further, when detecting that a voltage signal outputted by the signal detection circuit 90 jumps from the high voltage to the low voltage, the first controller 60 recognizes the power-on signal and performs subsequent power-on control. Referring to the description for the first detection circuit, the second controller 70 may recognize the power-on signal through the second detection circuit and perform power-on control. It is to be understood that after the first controller 60 and the second controller 70 perform the power-on control, the motor 30 starts to rotate. During an operation of the motor 30, the signal switch 40 is not pressed, and the signal detection circuit 90 keeps outputting the high-voltage signal until the signal switch 40 is pressed again for a power-off operation, then the output voltage of the signal detection circuit 90 jumps from the high voltage to the low voltage again, that is, the signal detection circuit 90 outputs the power-off signal.

In an example, the diodes D1 and D1' in the signal detection circuit 90 can prevent the case where another abnormal voltage signal is detected when the contact 2 connected to the interface 901 is in the suspended state so that the signal detection circuit 90 is triggered wrongly, thereby affecting the accuracy of power on-off control. The capacitors C1 and C1' can ensure that the signal detection circuit 90 can detect two independent signal switches for two controllers respectively, so as to improve safety of the power-off control.

In an example, high and low levels are used for representing high and low voltages in an electronic circuit. Generally, the high level may be labeled 1 and the low level may be labeled 0.

Figure 4:
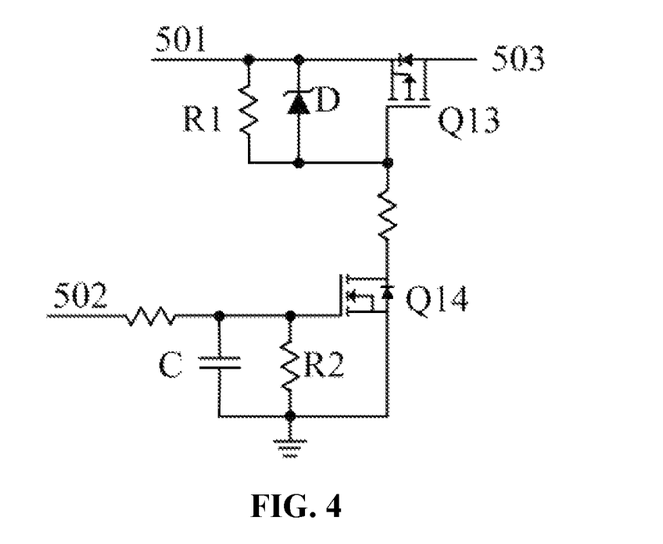
FIG. 4 is a circuit diagram of a power-on control switch according to an example.

The power-on control switch 50 is connected between the auxiliary power supply circuit 20 and the second controller 70 and configured to control a power-on state of the second controller 70. In an example, as shown in FIG. 4, the power-on control switch 50 includes a power supply interface 501 connected to the auxiliary power supply circuit 20, an input interface 502 connected to the first controller 60, an output interface 503 connected to the second controller 70, a switch element Q13 connected to the output interface 503, and a switch element Q14 connected between Q13 and the input interface 502. The switch element Q14 is a switch that is on at a high level and the switch element Q13 is a switch that is on at a low level. In a specific implementation, in conjunction with a signal timing diagram shown in FIG. 6, in the case where the signal switch 40 is pressed, the signal detection circuit 90 outputs a high-level voltage signal; after detecting the signal, the first controller 60 outputs a high-level control signal to the interface 502 and the switch element Q14 is turned on so that the switch element Q13 is grounded and then turned on; after the switch element Q13 is turned on, a power supply connected to the interface 501 powers on the second controller 70 through the interface 503. A diode D and a resistor R1 connected in parallel with the switch element Q13 are configured to generate a drive voltage for making the switch element Q13 on at the low level, and a capacitor C and a resistor R2 connected in parallel with the switch element Q14 are configured to generate a drive voltage for making the switch element Q14 on at the high level.

In an example, the switch elements Q13 and Q14 in the power-on control switch 50 may be solid-state switches or controllable semiconductor power devices such as an insulating metal-oxide-semiconductor field-effect transistor (MOSFET), an insulated-gate bipolar transistor (IGBT), and a bipolar junction transistor (BJT).

The first controller 60 is connected to at least the power-on control switch 50 and controls the power-on state of the second controller 70 by controlling an on/off state of the power-on control switch 50. In an example, in the case where the first controller 60 controls the power-on control switch 50 to be turned on, the second controller 70 is powered on, and in the case where the first controller 60 controls the power-on control switch 50 to be turned off, the second controller 70 is de-energized.

The second controller 70 is connected to at least the power-on control switch 50, energized in the case where the power-on control switch 50 is turned on, and de-energized in the case where the power-on control switch 50 is turned off. After powered on, the second controller 70 may control the motor 30 to rotate or stop rotating according to a detection signal outputted by the signal detection circuit 90.

Figure 5:
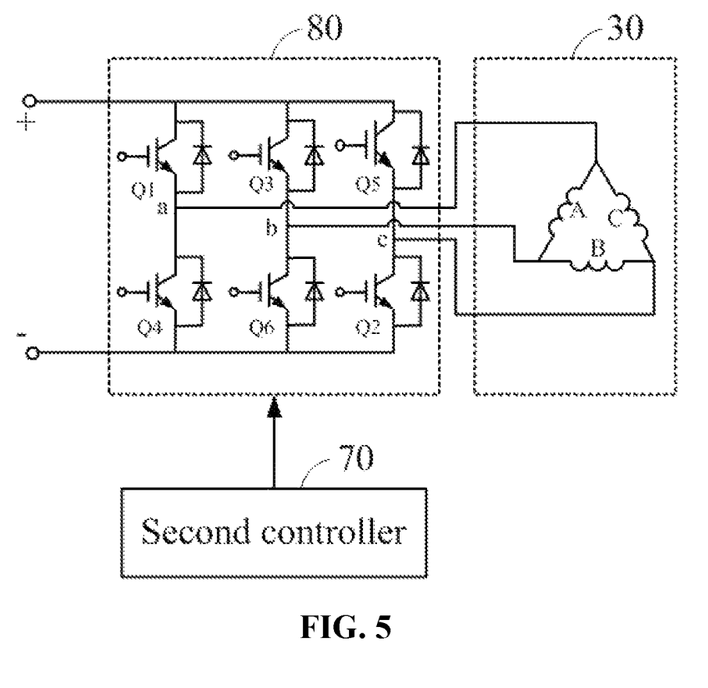
FIG. 5 is a circuit diagram of a driver circuit according to an example.

The driver circuit 80 is connected between the second controller 70 and the motor 30, includes several semiconductor switch elements, and is configured to switch an energized state of the motor. In an example, the driver circuit 80 is electrically connected to stator windings of the motor 30 and configured to transmit a power current to the stator windings to drive the motor 30 to rotate. As an example, as shown in FIG. 5, the driver circuit 80 includes multiple switch elements Q1, Q2, Q3, Q4, Q5, and Q6. Gates of the switch elements are electrically connected to the second controller 70 and configured to receive control signals from the second controller 70. Drains or sources of the switch elements are connected to the stator windings of the motor 30. The switch elements Q1 to Q6 receive the control signals from the second controller 70 to change respective conduction states, thereby changing a current loaded on the stator windings of the motor 30 by the power supply. In an example, the switch elements Q1 to Q6 in the driver circuit 80 may be a three-phase bridge driver circuit including six controllable semiconductor power devices (such as the FET, BJT, and IGBT) or any other types of solid-state switches (such as the IGBT and BJT).

To rotate the motor 30, the driver circuit 80 has multiple driving states. In one driving state, the stator windings of the motor 30 generate a magnetic field, the second controller 70 outputs corresponding PWM control signals to the switch elements in the driver circuit 80 according to a position of a rotor or a back electromotive force of the motor so that the driving state of the driver circuit 80 is switched and thus the stator windings generate a changing magnetic field to drive the rotor to rotate, thereby achieving the rotation or commutation of the motor 30. It is to be noted that any other circuits and control manners that can drive the rotation or commutation of the motor 30 can be used in the present disclosure and the circuit structure of the driver circuit 80 and the control of the driver circuit 80 by the second controller 70 are not limited in the present disclosure.

In examples of the present application, the second controller 70 is used as a master controller to directly control the motor 30 to rotate or stop rotating; and the first controller 60 is used as a slave controller to indirectly control the second controller 70 to be powered on through the power-on control switch 50, thereby controlling the motor 30 to rotate or stop rotating.

In an example, after the power supply interface 10 is connected to the power supply, the power on-off control process of the power tool 100 is described below.

Before the signal switch 40 is pressed, the three contacts 1, 2 and 3 of the signal switch 40 are not in contact with each other, and the voltage signal outputted by the signal detection circuit 90 is always at the high level. In the case where the user presses the signal switch 40, the contacts 2 and 3 of the signal switch 40 are connected, the interface 901 of the signal detection circuit 90 is grounded, and the voltage signal outputted by the signal detection circuit 90 jumps from the high level to the low level so that the controllers connected to the signal detection circuit 90 can recognize the power-on signal of the power tool 100. After recognizing the power-on signal, the first controller 60 outputs the high-level control signal to control the power-on control switch 50 to be turned on so that the second controller 70 is powered on. After the second controller 70 is powered on, if detecting that the output voltage of the signal detection circuit 90 still remains a current low-level state, that is, the signal switch 40 is still in the pressed state, the second controller 70 outputs the control signals to the driver circuit 80, so as to control the motor 30 to rotate. On the contrary, after the second controller 70 is powered on, if it is detected that the output voltage of the signal detection circuit 90 is at the high level, the motor 30 is not driven to rotate. It is to be understood that in the preceding power-on control process, only after the first controller 60 controls the power-on control switch 50 to be turned on, can the second controller 70 be powered on and detect the detection signal outputted by the signal detection circuit 90, that is, a difference exists between the time when the first controller 60 detects the power-on signal and the time when the second controller 70 detects the power-on signal so that the pressing operation of the user needs to be maintained for at least a small time period for the second controller 70 to detect the power-on signal.

Further, during a normal operation after the power tool 100 is powered on, the first controller 60 and the second controller 70 may cooperate to control the power tool 100 to be powered off. Specifically, the first controller 60 monitors a level state of the output voltage of the signal detection circuit 90 in real time after the power tool 100 is powered on. When detecting that an output level jumps from the high level to the low level, the first controller 60 recognizes the power-off of the power tool 100 and then outputs a low-level control signal to control the power-on control switch 50 to be turned off so that the second controller 70 is de-energized and thus the second controller 70 disconnects the driving control of the motor 30. In an example, the first controller 60 may acquire electrical parameters of the motor 30 (such as a current or voltage of the motor) and determine whether the motor 30 is operating normally according to the acquired electrical parameters. Further, when determining that the motor 30 is in an abnormal operation state (for example, the case where the motor is damaged such as a short circuit), the first controller 60 controls the power-on control switch 50 to be turned off so that the second controller 70 is de-energized and thus the second controller 70 disconnects the driving control of the motor 30.

In an optional implementation manner, the second controller 70 may directly control the power tool 100 to be powered off. Specifically, during the normal operation of the power tool 100, when detecting that the level of the output voltage of the signal detection circuit 90 jumps from the high level to the low level, the second controller 70 recognizes the power-off of the power tool 100 and then disconnects the driving control of the motor 30. In an example, the second controller 70 may also acquire the electrical parameters of the motor 30 and determine whether the motor 30 is operating normally according to the acquired electrical parameters. Further, when determining that the motor 30 is in the abnormal operation state (for example, the case where the motor is damaged such as the short circuit), the second controller 70 disconnects the driving control of the motor 30.

In the preceding power on-off control process, the power on-off control of the power tool is achieved through two controllers in cooperation with the signal switch, providing better operability; and two independent power-off control manners improve the safety of power-off protection of the power tool while ensuring operation comfort.

In an optional implementation manner, the power on-off control process of the power tool may also be implemented in manners described below.

After the power supply is connected, the first controller 60 is powered on. After powered on, the first controller 60 instantly controls the power-on control switch 50 to be turned on without paying attention to whether the user performs a power-on operation so that the second controller 70 is also powered on. The control of the motor 30 by the second controller 70 after the second controller 70 is powered on and the power-off control of the motor 30 by the two controllers when the level state of the output voltage of the signal detection circuit 90 changes since the signal switch 40 is pressed are the same as those in the preceding examples and will not be repeated here. It is to be understood that in the power-on control process of the power tool, the first controller directly controls the power-on control switch to power on the second controller, which reduces the response time for driving the motor and further improves user experience.

In an example, during the operation of the power tool 100, the first controller 60 controls the power-on control switch 50 to be turned off in a preset time period after detecting that the signal detection circuit 90 outputs the power-off signal so that the second controller 70 is de-energized and thus the second controller 70 disconnects the driving control of the motor 30. The preset time period is a delay protection time set for a power-off delay of the power tool 100, which achieves the power-off delay protection of the power tool 100.

Figure 6:
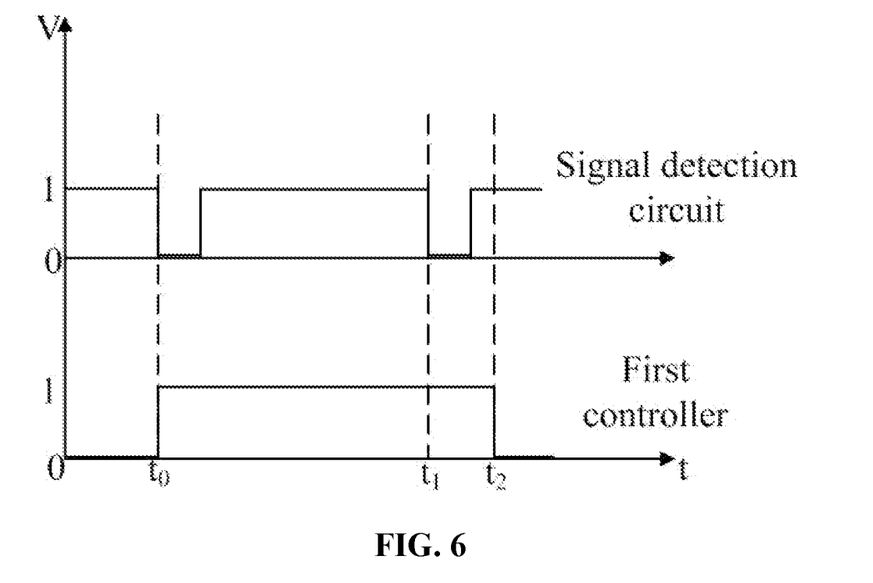
FIG. 6 is a level timing diagram according to an example.

In an example, the timing of level states of output voltages of the signal detection circuit 90 and the first controller 60 is shown in FIG. 6. In the signal timing shown in FIGS. 6, 1 and 0 represent high and low signal levels, respectively.

In a specific implementation, before the tool is powered on, that is, before the signal switch 40 is pressed, an output signal of the signal detection circuit 90 is at the high level, the control signal outputted by the first controller 60 is at the low level, and the power-on control switch 50 is in an off state. At time t0, the signal switch 40 is pressed, the contacts 2 and 3 of the signal switch 40 are connected, the output signal of the signal detection circuit 90 jumps from the high level to the low level, and the control signal outputted by the first controller 60 jumps from the low level to the high level so that the power-on control switch 50 is turned on and thus the second controller 70 is energized. It is to be noted that after the second controller 70 is powered on, if detecting that the signal detection circuit 90 is still in a low-level state, the second controller 70 controls the motor to rotate. After the second controller 70 is powered on, if detecting that the output level of the signal detection circuit 90 jumps back to the high level, the second controller 70 does not perform a power-on response of the motor. That is, the pressing operation of the signal switch 40 needs to be maintained for a time period so that after the first controller 60 powers on the second controller 70 in response to the power-on operation, the second controller 70 is given a time period for the power-on response. In this example, the power-on is triggered at time t0, and a maintenance time for the signal detection circuit 90 to remain the low-level state is a time for the first controller 60 and the second controller 70 to respond to the power-on and is also a shortest time for the user to maintain the pressing operation. In an example, the shortest time of the pressing operation may be 100 ms.

Further, after the power tool 100 is powered on, the output level of the signal detection circuit 90 jumps back to the high level and remains the high level during the operation of the tool until the signal switch 40 is pressed by the user again, so as to perform the power-off operation. At time $t_1$, the signal switch 40 is triggered for power-off and the output level of the signal detection circuit 90 jumps to the low level. In the case where the signal switch 40 is triggered for the power-off, the level state of the first controller 60 jumps from high to low at time $t_2$ and disconnects the control of the power-on control switch 50 so that the second controller 70 is de-energized and thus the motor stops rotating. The duration between time $t_1$ and time $t_2$ is a duration of the power-off delay. The duration of the power-off delay is set so that the power-off delay protection of the power tool 100 is achieved. It is to be noted that during the operation of the power tool 100, the second controller 70 needs to remain on, that is, the control signal outputted by the first controller 60 is always in the high-level state.

In an example, a shortest maintenance time of a power-off pressing operation may be the same as a shortest maintenance time of a power-on pressing operation, for example, 100 ms. In an example, the second controller 70 does not need to detect the level state of the signal detection circuit 90 in the case of the power-off and only needs to stop outputting a drive signal at the time of the power-off; therefore, the shortest maintenance time of the power-off pressing operation may be less than the shortest maintenance time of the power-on pressing operation.

A flowchart of a power on-off control method for a power tool 100 will be described below in conjunction with FIG. 7. The method includes steps described below.

In S102, a power supply is connected.

In S104, a first controller controls a power-on control switch to be turned on.

In an example, the first controller may turn on the power-on control switch by outputting a high-level control signal, thereby powering on a second controller.

In S106, a second controller is powered on.

In S108, the second controller detects whether a level of an output voltage of a signal detection circuit jumps from a high level to a low level. If so, step S110 is performed. If not, detection is continued.

In S110, the second controller controls a motor to rotate.

In S112, the first controller detects whether the level of the output voltage of the signal detection circuit jumps from the high level to the low level. If so, step S114 is performed. If not, the detection is continued.

In S114, the first controller controls the power-on control switch to be turned off.

In S116, the second controller is de-energized.

In S118, the motor stops rotating.

Figure 7:
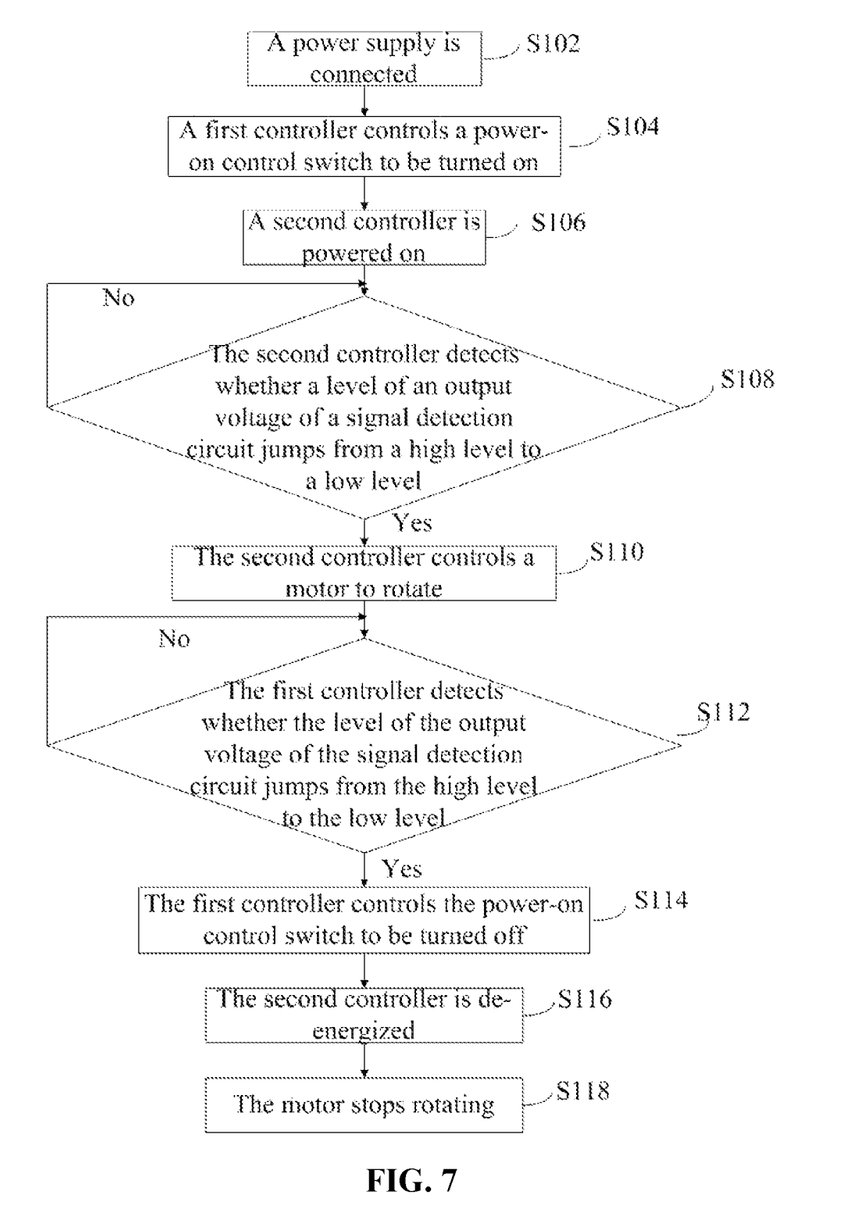
FIG. 7 is a flowchart of a power on-off control method for a power tool according to an example.
Figure 8:
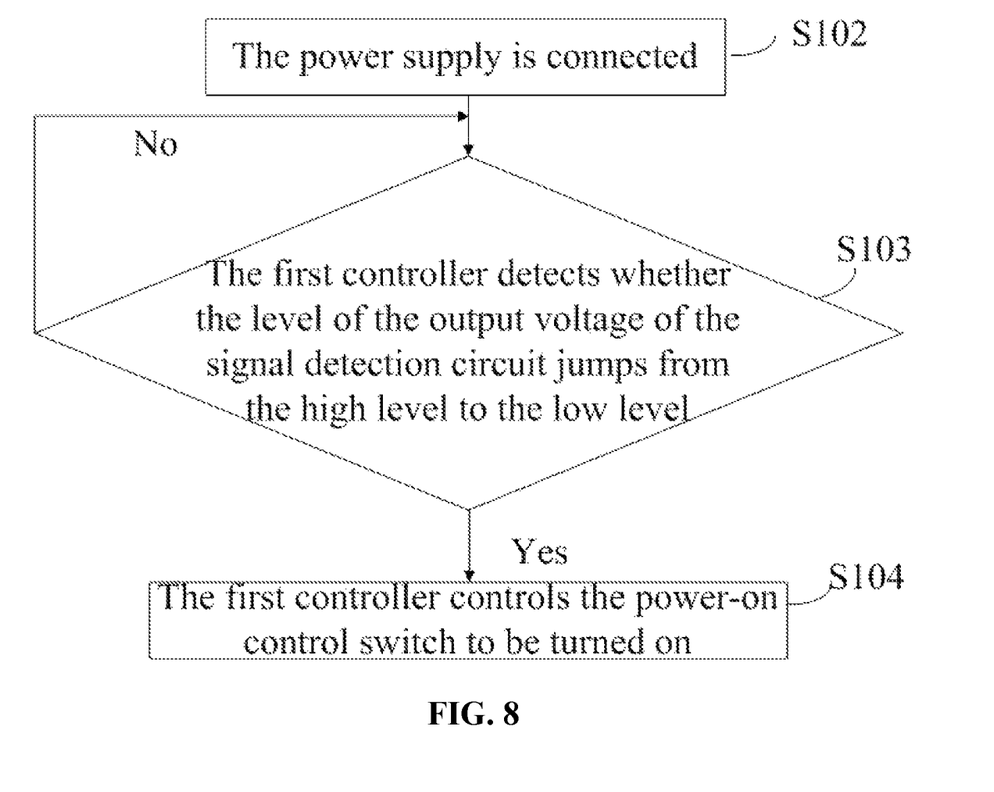
FIG. 8 is a flowchart of a power on-off control method for a power tool according to an example.

In an example, as shown in FIG. 8, for a control process shown in FIG. 7, the first controller needs to detect whether a level of an output voltage of a signal switch jumps from the high level to the low level before controlling the power-on control switch to be turned on. Specific steps are described below.

In S102, the power supply is connected.

In S103, the first controller detects whether the level of the output voltage of the signal detection circuit jumps from the high level to the low level. If so, step S104 is performed. If not, the detection is continued.

In S104, the first controller controls the power-on control switch to be turned on.

It is to be noted that for a control process after step S104, reference may be made to the description of steps S106 to S118 in FIG. 7. Details are repeated here.

Figure 9:
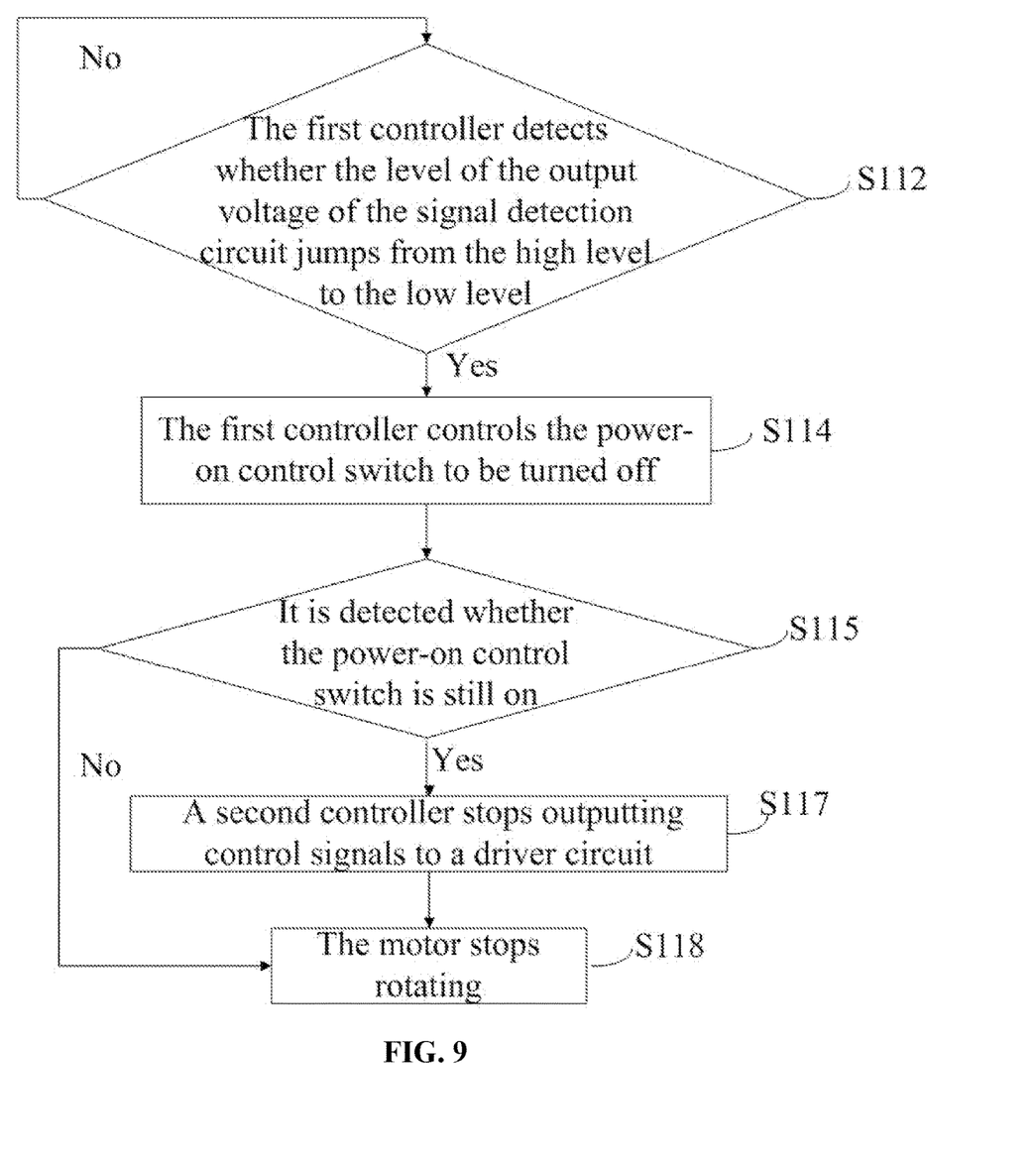
FIG. 9 is a flowchart of a power on-off control method for a power tool according to an example.

In an example, as shown in FIG. 9, specific steps of a power on-off control process of the power tool are described below.

It is to be noted that for a power-on process of the tool in this example, reference may be made to the description of steps S102 to S110 in the preceding example. Details are not repeated here. A power-off control process of the tool is mainly described below.

In S112, the first controller detects whether the level of the output voltage of the signal detection circuit jumps from the high level to the low level. If so, step S114 is performed. If not, the detection is continued.

In S114, the first controller controls the power-on control switch to be turned off.

In S115, it is detected whether the power-on control switch is still on. If so, step S117 is performed. If not, step S118 is performed.

It is to be understood that after the signal detection circuit outputs the power-off signal, if the power-on control switch still remains on, the first controller may fail so that the first controller cannot control the power-on control switch to be turned off. In an example, the first controller may have problems such as failing to detect the power-off signal and failing to output a control signal.

In S117, the second controller stops outputting control signals to a driver circuit.

It is to be understood that in the case where the power-on control switch remains on, when detecting the power-off signal outputted by the signal detection circuit, the second controller directly stops outputting the control signals to the driver circuit and disconnects the control of the motor.

In S118, the motor stops rotating.

Figure 10:
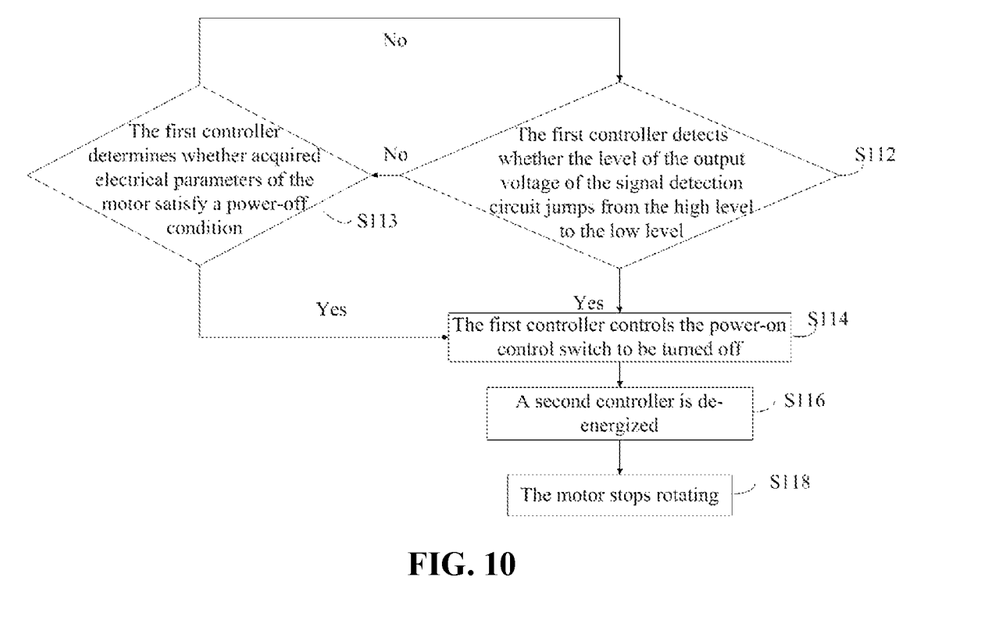
FIG. 10 is a flowchart of a power on-off control method for a power tool according to an example.

In an example, as shown in FIG. 10, specific steps of the power on-off control process of the power tool are described below.

It is to be noted that for the power-on process of the tool in this example, reference may be made to the description of steps S102 to S110 in the preceding example. Details are not repeated here. The power-off control process of the tool is mainly described below.

In S112, the first controller detects whether the level of the output voltage of the signal detection circuit jumps from the high level to the low level. If so, step S114 is performed. If not, step S113 is performed.

In S113, the first controller determines whether acquired electrical parameters of the motor satisfy a power-off condition. If so, step S114 is performed. If not, step S112 is performed.

In S114, the first controller controls the power-on control switch to be turned off.

In S116, the second controller is de-energized.

In S118, the motor stops rotating. It is to be noted that for a detailed execution process of each step in the preceding charging method example, reference may be made to the description in the examples of the power tool. Details are not repeated here.

The preceding manners may be performed through software programs written into two controllers.

It is to be noted that the above are merely preferred examples of the present disclosure and technical principles used therein. It is appreciated by those skilled in the art that the present disclosure is not limited to the examples described herein. Those skilled in the art can make various apparent modifications, adaptations, and substitutions without departing from the scope of the present disclosure. Therefore, while the present disclosure has been described in detail through the preceding examples, the present disclosure is not limited to the preceding examples and may include equivalent examples without departing from the concept of the present disclosure. The scope of the present disclosure is determined by the scope of the appended claims.

What is claimed is:

1. A power tool, comprising:
a motor;
a power supply interface configured to be connected to a power supply;
a controller configured to control an operation of the motor, wherein the controller comprises a first controller and a second controller;
an auxiliary power supply circuit configured to power on the controller;
a signal switch triggerable by a user to switch a power on/off state of the power tool;
a signal detection circuit connected between the signal switch and the controller configured to output a detection signal according to a connection state of the signal switch, wherein the detection signal caused to be output is one of a power-on signal and a power-off signal;
a power-on control switch connected between the auxiliary power supply circuit and the second controller configured to control a power-on state of the second controller; and
a driver circuit connected between the second controller and the motor, comprising plural semiconductor switch elements, configured to switch an energized state of the motor;
wherein the first controller is electrically connected to at least the power-on control switch and is configured to control an on/off state of the power-on control switch, the second controller is connected to at least the signal detection circuit, the power-on control switch, and the driver circuit and is configured to control on/off states of the switch elements in the driver circuit, the first controller is configured to control the power-on control switch to be turned off so that the second controller is de-energized and the motor stops rotating when the signal detection circuit outputs the power-off signal, and the second controller is configured to control the switch elements in the driver circuit to be turned off so that the motor stops rotating when the signal detection circuit outputs the power-off signal and the power-on control switch still remains on.

2. The power tool of claim 1, wherein the power-on signal indicates that an output voltage of the signal detection circuit jumps from a high voltage to a low voltage and the power-off signal indicates that the output voltage of the signal detection circuit jumps from the high voltage to the low voltage in a case where the motor is on.

3. The power tool of claim 2, wherein the first controller controls the power-on control switch to be turned on in a case where the power supply interface is connected to the power supply, the second controller is powered on in a case where the power-on control switch is on, and the second controller controls the motor to rotate in a case where the signal detection circuit outputs the power-on signal.

4. The power tool of claim 2, wherein the first controller controls the power-on control switch to be turned on in a case where the signal detection circuit outputs the power-on signal, the second controller is powered on in a case where the power-on control switch is on, and the second controller controls the motor to rotate in the case where the signal detection circuit outputs the power-on signal.

5. The power tool of claim 2, wherein in a case where the motor is on and the signal detection circuit outputs the power-off signal, the first controller controls the power-on control switch to be turned off after a preset time period so that the second controller is de-energized and the motor stops rotating.

6. A control circuit, comprising:
   a motor;
   a controller, wherein the controller comprises a first controller and a second controller;
   a power supply interface configured to be connected to a power supply;
   an auxiliary power supply circuit configured to power on the controller;
   a signal switch triggerable by a user to switch a power on/off state of a power tool;
   a signal detection circuit connected between the signal switch and the controller configured to output a detection signal according to a connection state of the signal switch, wherein the detection signal caused to be output is one of a power-on signal and a power-off signal;
   a power-on control switch connected between the auxiliary power supply circuit and the second controller configured to control a power-on state of the second controller; and
   a driver circuit connected between the second controller and the motor, comprising plural semiconductor switch elements, configured to switch an energized state of the motor;
   wherein the first controller is electrically connected to at least the power-on control switch and is configured to control an on/off state of the power-on control switch, the second controller is connected to at least the signal detection circuit, the power-on control switch, and the driver circuit and is configured to control on/off states of the switch elements in the driver circuit, the first controller is configured to control the power-on control switch to be turned off so that the second controller is de-energized and the motor stops rotating when the signal detection circuit outputs the power-off signal, and the second controller is configured to control the switch elements in the driver circuit to be turned off so that the motor stops rotating when the signal detection circuit outputs the power-off signal and the power-on control switch still remains on.

7. The control circuit of claim 6, wherein the power-on signal indicates that an output voltage of the signal detection circuit jumps from a high voltage to a low voltage, and the power-off signal indicates that the output voltage of the signal detection circuit jumps from the high voltage to the low voltage in a case where the motor is on.

8. The control circuit of claim 7, wherein the first controller controls the power-on control switch to be turned on in a case where the power supply interface is connected to the power supply, the second controller is powered on in a case where the power-on control switch is on, and the second controller controls the motor to rotate in a case where the signal detection circuit outputs the power-on signal.

9. The control circuit of claim 7, wherein the first controller controls the power-on control switch to be turned on in a case where the signal detection circuit outputs the power-on signal, the second controller is powered on in a case where the power-on control switch is on, and the second controller controls the motor to rotate in the case where the signal detection circuit outputs the power-on signal.

10. The control circuit of claim 7, wherein in a case where the motor is on and the signal detection circuit outputs the power-off signal, the first controller controls the power-on control switch to be turned off after a preset time period so that the second controller is de-energized and the motor stops rotating.

11. A control method of a power tool, wherein the power tool comprises a power supply interface connected to a power supply, a controller, an auxiliary power supply circuit, comprised of a first controller and a second controller, configured to power on the controller, a motor, a signal switch triggerable by a user to switch a power on/off state of the power tool, a power-on control switch connected between the auxiliary power supply circuit and the second controller and configured to control a power-on state of the second controller, and a driver circuit connected between the second controller and the motor to switch an energized state of the motor and comprising plural semiconductor switch elements, the first controller is electrically connected to at least the power-on control switch and is configured to control an on/off state of the power-on control switch, the second controller is connected to at least a signal detection circuit, the power-on control switch, and the driver circuit and is configured to control on/off states of the switch elements in the driver circuit, and the control method comprises:
   in a case where the signal detection circuit outputs a power-off signal, controlling, by the first controller, the power-on control switch to be turned off so that the second controller is de-energized and the motor stops rotating; and
   in a case where the signal detection circuit outputs a power-off signal and the power-on control switch still remains on, controlling, by the second controller, the switch elements in the driver circuit to be turned off so that the motor stops rotating.

12. The control method of claim 11, wherein a power-on signal comprises that an output voltage of the signal detection circuit jumps from a high voltage to a low voltage, and the power-off signal comprises that the output voltage of the signal detection circuit jumps from the high voltage to the low voltage in a case where the motor is on.

13. The control method of claim 12, wherein the first controller controls the power-on control switch to be turned on in a case where the power supply interface is connected to the power supply, the second controller is powered on in a case where the power-on control switch is on, and the second controller controls the motor to rotate in a case where the signal detection circuit outputs the power-on signal.

* * * * *